United States Patent [19]

Budworth et al.

[11] 3,892,915

[45] July 1, 1975

[54] STENOGRAPHIC DATA RECORDING APPARATUS AND METHOD

[75] Inventors: Ronald L. Budworth; Richard A. Van Leer, both of San Jose, Calif.

[73] Assignee: Transcripts, Inc., Sunnyvale, Calif.

[22] Filed: Dec. 10, 1973

[21] Appl. No.: 423,356

[52] U.S. Cl. ........................ 178/21; 197/9; 197/19; 340/172.5; 340/365 S; 340/365 P; 340/365 E

[51] Int. Cl. .......................... B41j 3/26; G06f 15/20

[58] Field of Search ...................... 340/172.5, 365 S; 178/17.5, 21; 197/9, 19, 19 X

[56] References Cited

UNITED STATES PATENTS

| | | | |
|---|---|---|---|
| 3,557,927 | 1/1971 | Wright et al. | 197/9 |
| 3,558,820 | 1/1971 | Baisch et al. | 178/17.5 |
| 3,597,538 | 8/1971 | Binenbaum | 178/21 X |
| 3,651,463 | 3/1972 | Rawson et al. | 340/365 S |
| 3,665,115 | 5/1972 | Snook | 178/21 |
| 3,721,976 | 3/1973 | Kuijsten | 340/365 S |
| 3,731,278 | 5/1973 | Eldridge et al. | 340/172.5 |
| 3,781,874 | 12/1973 | Jennings | 340/365 S |
| 3,786,497 | 1/1974 | Davis et al. | 340/365 S |

*Primary Examiner*—Gareth D. Shaw
*Assistant Examiner*—James D. Thomas
*Attorney, Agent, or Firm*—Townsend and Townsend

[57] ABSTRACT

Apparatus and a method for recording stenographic information in the form of binary electronic signals. A stenographic machine having a plurality of shiftable keys representing corresponding characters utilizes a switch for each key, respectively. In one embodiment, the states of all keys are successively scanned or sampled to determine which of the various keys have been depressed for the recording of a word or phrase represented by one or more of the characters. Then the sampled data are stored as binary signals in a memory for subsequent readout. In another embodiment, the actuation of the keys causes binary signals to be directed in parallel into a memory. In both embodiments, the signals stored in the memory are read out therefrom, such as to a tape recorder, in groups with each group corresponding to a certain fraction of the total number of available characters and with each group having an identifying code associated therewith. The readout of data from the memory is delayed until the one or more keys which were depressed to record a word or phrase have been released to signify the end of the word or phrase prior to depressing the next key or keys representing a subsequent word or phrase.

10 Claims, 6 Drawing Figures

PATENTED JUL 1 1975 .892,915

SHEET 1

STENOGRAPHIC DATA RECORDING APPARATUS AND METHOD

This invention relates to improvements in the recording of stenographic data and more particularly, to apparatus and a method for recording stenographic information in the form of binary electrical signals.

BACKGROUND OF THE INVENTION

Convention stenographic machines utilize a keyboard with a number of keys for causing one or more of 22 characters defining a phonetic code to be printed on a paper tape so that the resulting record will provide a transcription of words in an abbreviated fashion. Attempts have been made to convert the mechanical movements of the keys of a stenographic machine to electrical signals so that they can be compatible for use with a central processor which, in turn, will provide a translation from the electrical signals to readable language. Two patents, namely U.S. Pat. Nos. 3,557,927 and 3,731,278 have disclosed one way in which electrical signals generated directly by the depressing of the keys of a stenographic machine can be used for this purpose. In each of these patents, means is disclosed to correlate key-generated data signals with a number of uniformly spaced clock pulses, both the key generated data signals and the clock pulses being directly and serially recorded on separate channels of a magnetic tape when one or more keys of the keyboard are actuated. Thereafter, the recorded data and clock signals are read out from the tape to a computer as 7-bit words having no specific identification codes.

The signal handling technique disclosed in these patents requires a considerable amount of tape in that all keys of the keyboard have corresponding positions on each of a plurality of intervals, each interval having a width equal to the length of the span of characters which could be printed or recorded if all keys were actuated. Thus, each interval must accommodate 22 signals and each interval has 22 corresponding clock signals even though less than 22 keys will have been depressed to generate the signals corresponding to a word or phrase. Moreover, the identification of the signals generated by this technique is a problem because the aforesaid patents do not disclose a simple way to distinguish between the various 7-bit words of our entire character interval so as to determine the end of one word or phrase and the beginning of the next word or phrase. Thus, presenting the data to a central processor complicates the handling of the data inasmuch as multiple passes through the central processor are required to achieve accuracy of translation using signals generated and handled by the techniques of the above patents.

SUMMARY OF THE INVENTION

The present invention is directed to an apparatus and a method for recording of stenographic information in the form of binary electrical signals wherein the signals are generated after one or more of the keys of a conventional stenographic machine are depressed. In one embodiment, the operative conditions of switches generated by this step are stored temporarily. In another embodiment, key actuation causes data signals to be sent in parallel directly into a memory. From the memory, the signals are read out to a recording medium to a central processor in character groups with each group having an identifying code to distinguish it from the other groups. The readout of the signals is accomplished without the readout of corresponding clock signals as in the prior patents mentioned above.

For purposes of illustration, there are four 6-bit character groups each representing 6 characters of the keyboard. Each group and its identifying code form a byte which is readily accommodated in data storage and data readout modes. One of the groups is always recorded even though it may not contain data signals. This assures that a central processor will always have a known reference as to the correlation between the data signals and the characters which such signals represent. The other groups are not recorded if they contain no data signals. Thus, this feature conserves space on the recording medium on which the signals are recorded.

The scanning of the states of the key-actuated switches is done at a rate much higher than the rate at which the keys can be depressed by the machine operator. Data storage prior to data readout is controlled by inhibiting readout and continuing the scanning step until one or more keys used to record a word or phrase have been released. This assures that the operator can even roll the fingers from one key to another in completing a word or phrase without causing an interruption in the data directed to the memory, thereby eliminating errors in recording the data which might otherwise occur if the scanning and data storage were interrupted by the release of one key while another key was still depressed. The apparatus of the invention also has means for generating signals which identify a particular keyboard.

The primary object of this invention is to provide an apparatus and a method for recording key-actuated information in the form of binary electrical signals wherein the signals are stored temporarily so that they can be sequentially directed out of the storage medium onto a recording medium or a central processor in discrete character-defining groups while at the same time the signal groups are provided with identification codes to distinguish the various groups from each other.

Another object of this invention is to provide an apparatus and a method of the type described wherein the states of a plurality of key-actuated switches are serially scanned to generate signals corresponding to depressed keys of a stenographic keyboard so that such signals can be stored and then serially read out from storage to a recording medium or to a central processor in the aforesaid groups with each group being provided with its own identifying prefix or symbols immediately after read-out thereof.

Still a further object of this invention is to provide apparatus and a method of the aforesaid character wherein the scanning and storing of the stenographic information is continued so long as one or more keys of the stenographic machine keyboard are depressed to thereby assure that all of the information corresponding to a particular word or phrase will be recorded even though one or more keys will have been released as another key remains depressed.

A further object of this invention is to provide apparatus for generating and recording stenographic information in the form of binary electrical data signals wherein the signals representing the respective keys of the keyboard of a stenographic machine are divided into groups and certain of said groups are not recorded if they have no data signals therein so that space on the recording medium is conserved to increase the useful operating time thereof.

Other objects of this invention will become apparent as the following specification progresses, reference being had to the accompanying drawings for an illustration of the invention.

Figure 1:
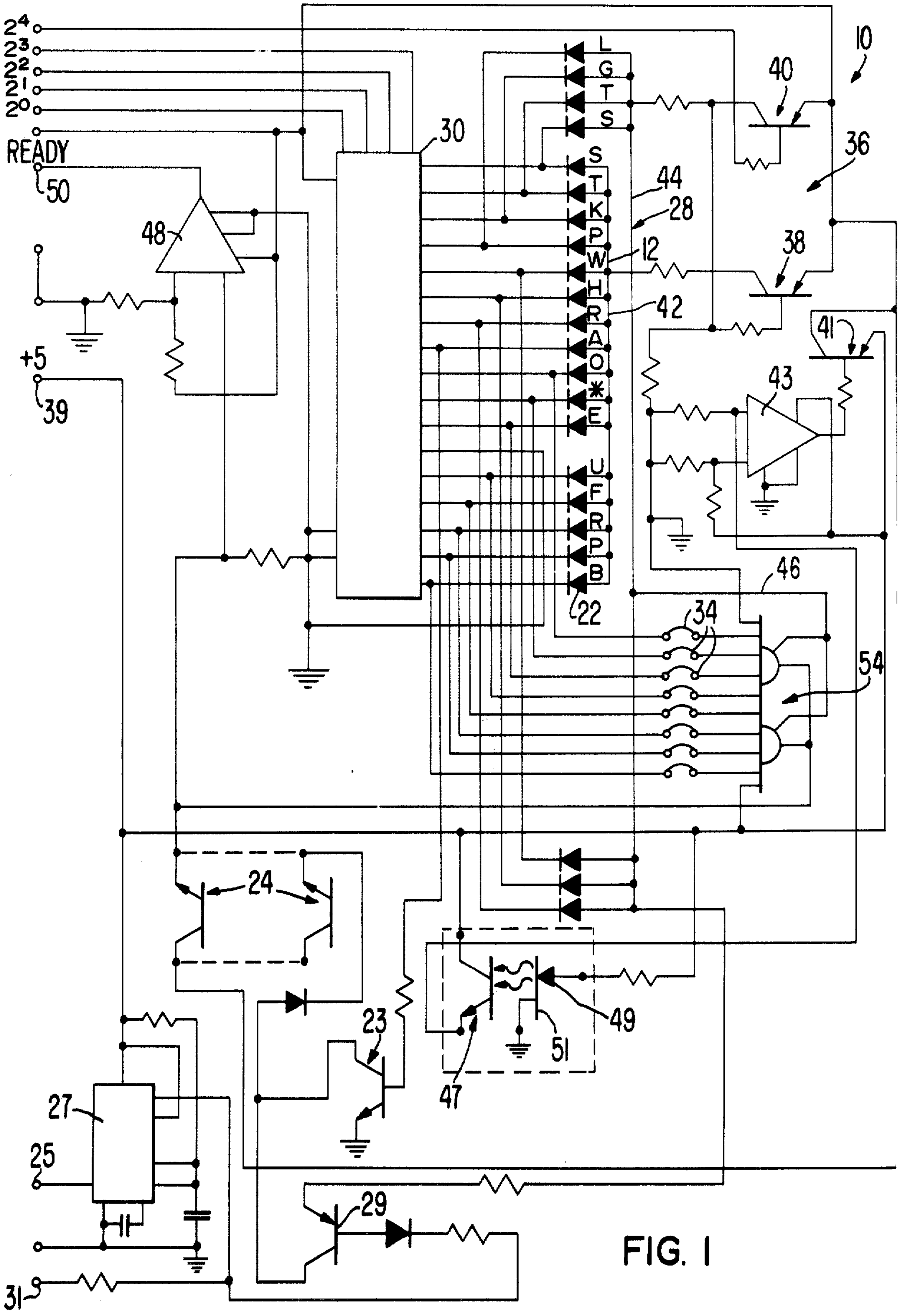
FIG. 1 is a schematic diagram of a scanning circuit for scanning the key-actuated switches of a keyboard of a stenographic machine forming a part of the system of the present invention to generate data signals in accordance with the depression of one or more of the keys of the keyboard.

The stenographic recording system of the present invention is broadly denoted by the numeral 10 and is adapted to convert the mechanical movement of the keys of a keyboard (not shown), such as that of a stenographic machine, to binary electrical signals which are grouped and recorded on a suitable recording medium, such as a magnetic tape, or transmitted on-line to a central processor remote from the keyboard. For purposes of illustration, system 10 will hereinafter be described with respect to the keyboard of a stenographic machine of the type used by court reporters. Such a machine normally has 23 keys for recording a number of characters in a phonetic code on a paper tape. The keyboard of this invention has 24 keys, the 24th key being an accent key used for a purpose to be described. The code may use only a single character to represent a word or may use a group of characters to represent a word or a phrase. The characters typically used with such a machine are as follows:

S T K P W H R A O * E U F R P B L G T S D Z

Numerals from 0 to 9 are associated with certain of the keys as is well-known; thus, for the purposes of this disclosure, it is sufficient to merely refer to the above letter characters.

Figure 3:
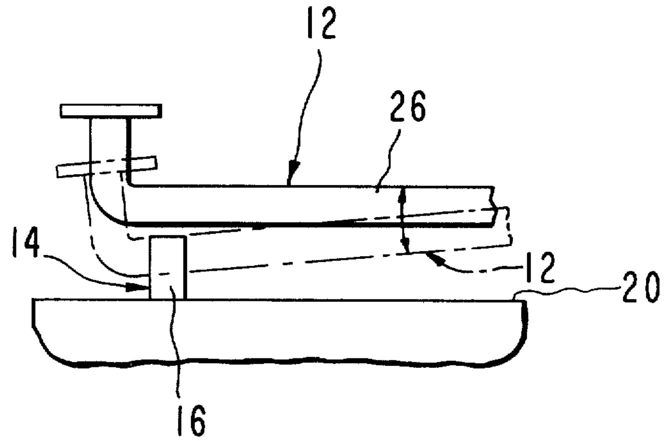
FIG. 3 is a fragmentary side elevational view of a key of the keyboard, showing the optical switch associated therewith.
Figure 4:
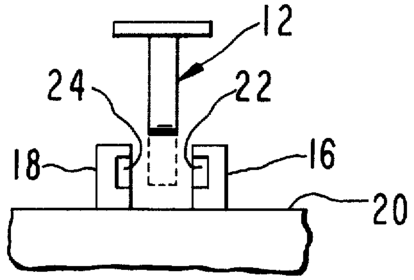
FIG. 4 is an end elevational view of the key and switch of FIG. 3.

The keyboard of the present invention has means for generating respective digital signals when the keys thereof are depressed, either one at a time, several at the same time, or successively as when the fingers roll off one or several keys and onto adjacent keys to complete a particular word or a phrase containing several words. A key 12 (FIGS. 3 and 4) is shown with an optical switch 14 to illustrate the way in which a respective digital signal is generated thereby when it is depressed. Switch 14 includes a pair of spaced posts 16 and 18 secured to and extending upwardly from a base plate 20 forming a part of the keyboard structure itself. Post 16 carries a light emitting diode 22 and post 18 carries a phototransistor detector 24 optically aligned with diode 22 to receive radiation therefrom. As key 12 is depressed, its flat arm-like body 26 passes between diode 22 and detector 24, thereby blocking the optical path formed thereby and generating a digital signal or a bit representing the actuation or depression of the key. Each key of the keyboard has its own optical switch 14. Thus, the stenographic machine of the invention can produce signals corresponding to the actuation of all of its keys. Other types of switches could be provided in lieu of the optical switch described above.

To determine which keys have been actuated for each word or phrase, a keyboard scanning circuit 28 (FIG. 1) is provided, circuit 28 including a demultiplexer unit 30 which serially provides 16 individual output key scan signals in response to the various individual counts or input signals provided by four bits of a 7-bit counter 32 (FIG. 2) operated by a master clock 33 having counts successively applied to the input terminals of unit 30. Demultiplexer unit 30 has a relatively high scan rate during scanning, such as 8000 keys per second, a rate much higher than that at which a skilled machine operator can depress the keys.

The output key scan signals of unit 30 successively energize light emitting diodes 22 for various keys of the keyboard, the scan being performed in two passes. During the first pass, the diodes relating to the following 16 characters are pulsed:

S T K P W H R A O * E U F R P D

During the second pass, diodes relating to the following 8 characters are pulsed:

L G T S D Z NB X

The term NB refers to the number bar of the keyboard. The term X refers to an accent bit generated by the actuation of an accent key (not shown) to the keyboard, the accent key being coupled to a terminal 25 (FIG. 1) coupled to the input of a monostable multivibrator 27 whose function will be hereinafter described. Also, during each second pass, the base of a transistor 23 and any one of a group of 8 keyboard identification terminals 34 are pulsed. Thus, there will be a scan of 16 elements for each pass.

An array selector 36, defined by a pair of transistors 38 and 40, is provided to permit the scanning of the two 16 element groups mentioned above. Array selector 36 is responsive to a fifth bit from counter 32, the collector of transistor 38 being coupled to a lead 42 common to the first group of 16 elements and transistor 40 being coupled to a lead 44 common to the first 8 elements of the second group and to a lead 46 common to the group of 8 keyboard identification terminals. Diodes 22 are successively energized by unit 30 during each scan. Power to transistors 38 and 40 is from a 5-volt source coupled to a terminal 39 (FIG. 1) applied to a transistor 41 whose base is controlled by a level comparator 43 responsive to a phototransistor 47 which is driven by a light-emitting diode 49 of a bail switch 51 of the keyboard.

Figure 2:
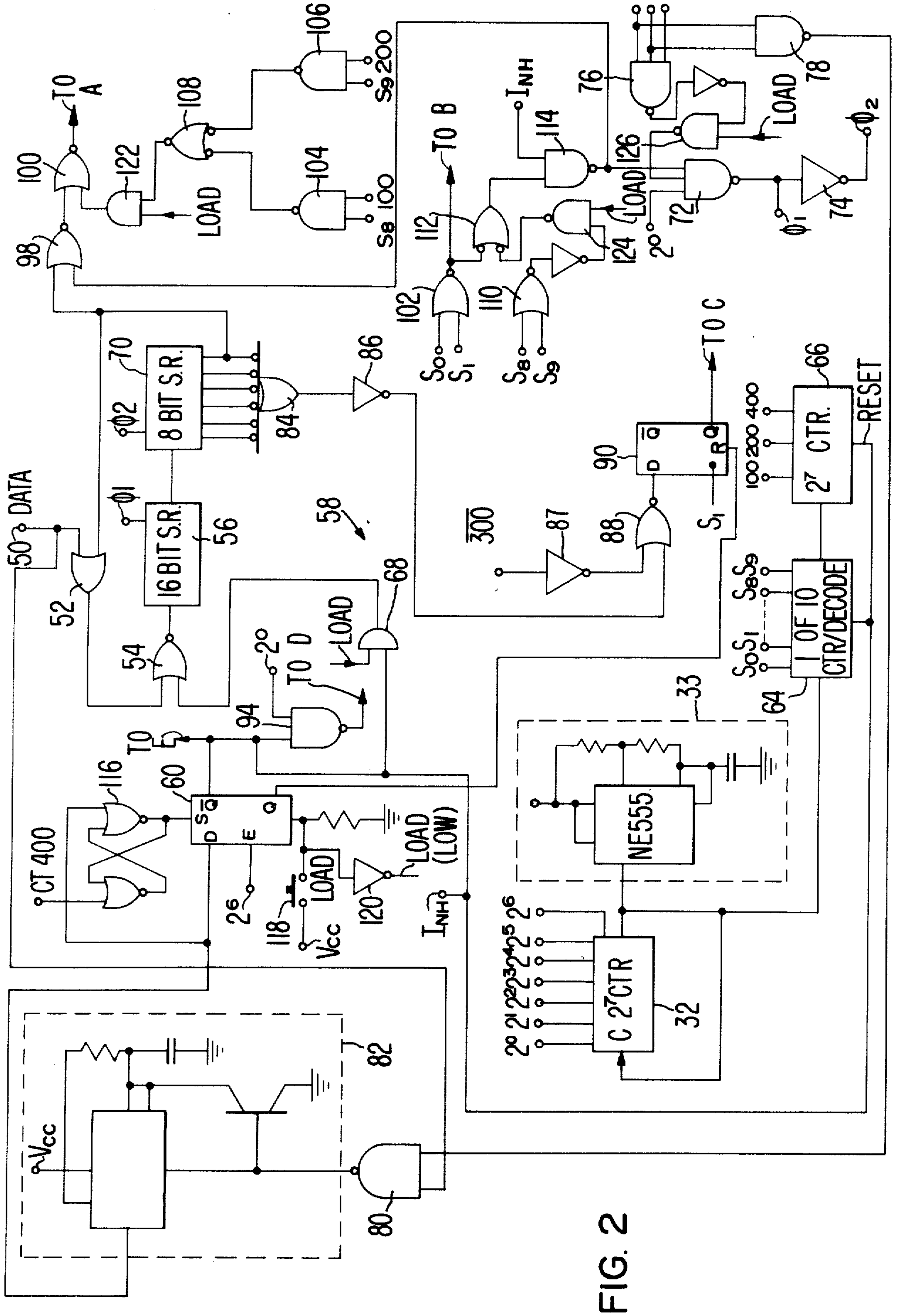
FIGS. 2 and 2a are schematic diagrams of a circuit containing a read-only memory and a sequencer for receiving the data signals from the circuit of FIG. 1 and for directing the same onto a recording medium or to a central processor.

As shown in FIG. 1, phototransistor detectors 24 are coupled in parallel and their emitters are connected to the input of a level comparator 48. The output terminal 50 of level comparator 48 is coupled to the input of an OR gate 52 (FIG. 2). Also, keyboard identification terminals 34 include one or more hard-wired conductive straps, up to eight in number, which bridge respective pairs of junctions. The outputs of terminals 34 are coupled by way of a summing junction 54 to the signal input of comparator 48.

For purposes of encoding the signals developed upon actuation of any one or a number of the 24 keys of the keyboard, such keys are considered to be divided into four 6-bit groups with each group being given a 2-bit identifying prefix. The prefixes for the 4 groups are 00, 01, 10 and 11. The 6 keys of each group are assigned individual binary weights. For example, the first group having prefix 00, the keys relating to characters H W P K T S are arranged according to the most and least significant binary digits of a 6-bit character. Thus, the groups and their prefixes are as follows:

| | |
|---|---|
| 00 | H W P K T S |
| 01 | U E * O A R |
| 10 | G L B P R F |
| 11 | X N B Z D S T |

Thus, each key group comprises a byte comprised of two identifying characters and 6 key characters. To illustrate, if keys corresponding to W K A B and D were to be depressed, the binary values of the four groups would be as follows:

00010100

01000010

10001000

11000100

When one or more keys 12 are depressed to record a word or phrase, scanning of the keyboard is started inasmuch as the actuation of the first key closes bail switch 51 which provides electrical power to scanning circuit 28. As the various keys are scanned, any key that had been depressed will cause its phototransistor detector to provide a one-bit output signal at the input of comparator 48. The one-bit output signal of amplifier 48 is coupled to the input of OR gate 52, (FIG. 2) whose output is coupled through a second OR gate 54 to the input of a 16-bit serial shift register 56.

The sequencing of bits into and out of shift register 52 is accomplished by means of a sequencing circuit 58 (FIG. 2) having a master-control flip-flop 60 initially in the set state. As shown in FIG. 2, the output of clock 33 is connected to the input of counter 32 to cause the latter to step through its various sequential states $2^0$ through $2^6$ at 8000 $H_z$. Also, the output of clock 33 is coupled to the clocking input of a first state counter 64 having individual output states $S^0$ through $S^9$. The output of first state counter 64 is coupled to the input of a second state counter 66 operable as a scale-of-four counter having states 100, 200, 300 and 400, states 100 and 200 both being high to represent the 300 state.

As counter 32 is stepped through its various states by clock 33, the individual key switches of keys 12 are scanned along with keyboard identifying terminals 34. Incoming digital data from comparator 48 (FIG. 1) are coupled to shift register 56 when gate 54 is enabled by a gate 68 coupled to the reset output of flip-flop 60. The output of shift register 56 is coupled to an 8-bit serial shift register 70 whose serial output is coupled back to the input of OR gate 52 for data recirculation. Shift registers 56 and 70 are clocked during the $2^0$ count of counter 32 by outputs labeled $\phi_1$ and $\phi_2$ of gate 72 and inverter 74 (FIG. 2) for each successive stroke position with the exception of those positions corresponding to the keyboard identification terminals 34. When counter 32 holds a count representing terminals 34, gate 72 is disabled by the output of AND gate 76. Also, when counter 32 holds a count representative of the scanning positions of terminal 34, an AND gate 78 disables an AND gate 80 to a one-shot multivibrator unit 82 which prevents error in the operation of the latter during the data load operation when terminals 34 are being scanned.

One-shot unit 82 is selected so that it has a period equal to the time required for a complete keyboard scan plus an additional time interval less than a complete keyboard scan interval. If a second key is actuated before a full keyboard scan interval has elapsed, unit 82 is re-triggered. If no additional key is actuated during a full keyboard scan interval, unit 82 times out. One-shot unit 82 operates only during data loading, i.e., during scanning of the key-actuated switches. Unit 82 does not operate during data read-out from shift registers 56 and 70.

During the time one-shot unit 82 is actuated, data is recirculated in shift registers 56 and 70. Such recirculation stops when one-shot unit 82 times out, signifying the end of a loading of data signals into shift registers 56 and 70. When unit 82 times out, it generates an enabling signal applied to flip-flop 60 causing data in shift registers 56 and 70 to be read out to a recording medium such as a magnetic tape, or to be placed on-line to a central processor when flip-flop 60 is reset by the $2^6$ count of counter 32.

When flip-flop 60 resets, gate 54 is disabled by the output of gate 68, and first and second state counters 64 and 66 are put in the reset state.

Figure 2A:
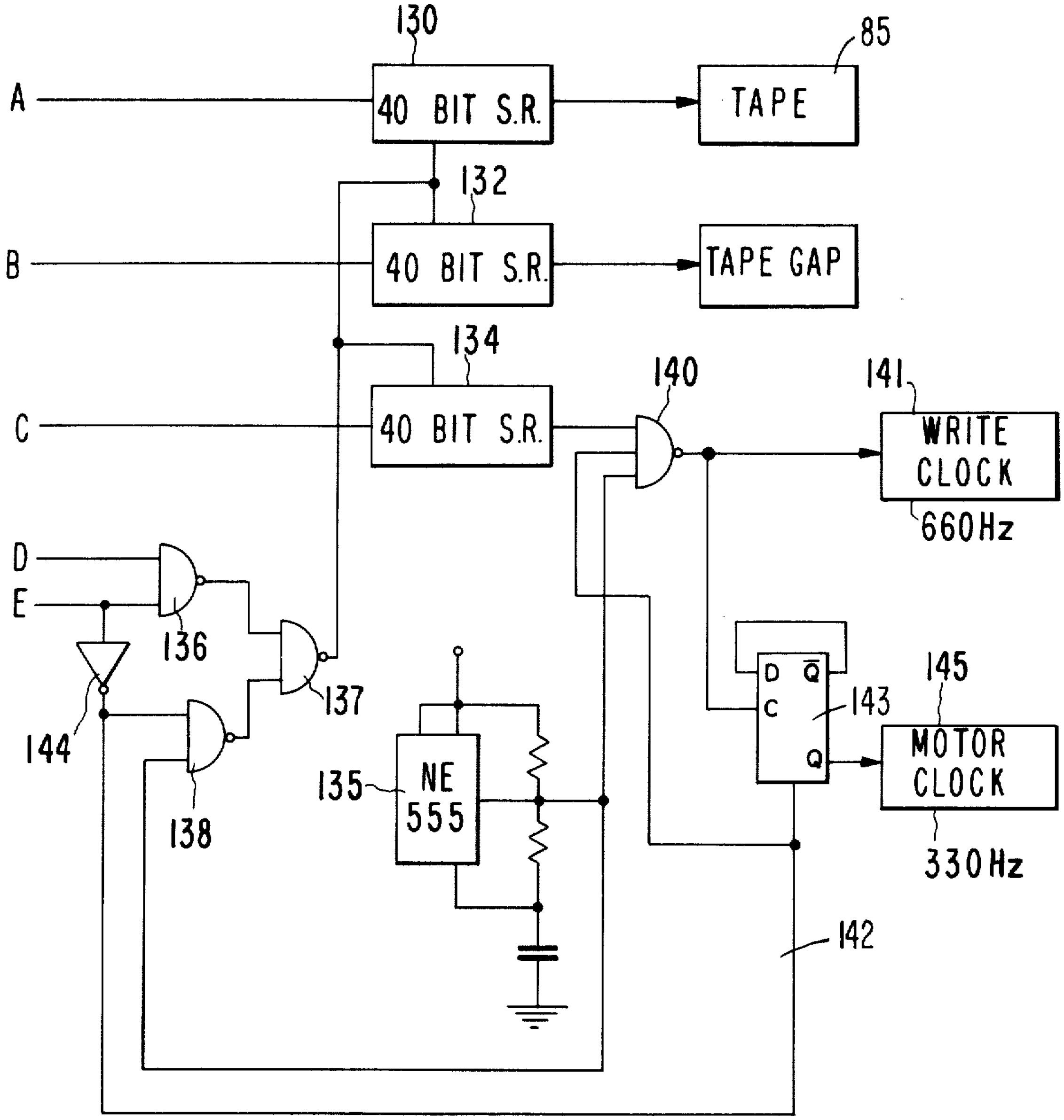

Buffer means is provided as shown in FIG. 2*a* to allow for fast read-out (i.e., 8000 $H_z$) of data signals from shift register 70 during a data fetch mode when a tape transport is used to record the data signals since the tape transport cannot operate properly at such a high rate. With reference to FIG. 2*a*, data signals applied to terminal A are coupled to the input of a first 40-bit serial shift register 130, gap signals applied to terminal B are coupled to the data input of a second 40-bit serial shift register 132, and a character group data qualifying signal on input terminal C is clocked to the input of a third 40-bit serial shift register 134. Shift registers 130, 132 and 134 function as buffer registers. A second clock 135 generates a clock signal train having a frequency compatible with the associated tape transport which is 660 $H_z$ in the preferred embodiment. This clock signal train is used to serially fetch the information in registers 130, 132 and 134 and to generate the write clock and motor clock signals required by the associated tape transport. The relatively high frequency clock signal train applied to terminal D (FIG. 2*a*) from the output of gate 94 (FIG. 2) enables the storage of data into registers 130, 132 and 134 at the higher rate provided by master clock 33 of FIG. 2 whenever a data fetch enabling signal is present on terminal E (from the output of master control flip-flop 60 shown in FIG. 2) via gate 136 and gate 137, the output of the latter gate being coupled to the clock inputs of the above-noted shift registers.

The read-out of data from system 10 will be described hereinafter with respect to a tape transport having a magnetic tape, such read-out being performed in the following manner: at the beginning of the read-out phase, the 6 bits corresponding to the first group of character bits, i.e., the group related to prefix 00, are arranged in shift register 70 with the least significant bit at the output stage thereof. A data qualifying OR gate 84 samples the state of the 6-bit positions of shift register 70 and produces a valid data signal by way of an inverter 86 if any one of the bit positions of shift register 70 holds a binary one, signifying the previous depression of a key corresponding to the first group of character bits. If a valid data signal is generated, an enabling signal is sent by way of an OR gate 88 to a flip-flop 90 which is reset when counter 64 reaches the $S_1$ count.

When flip-flop 90 is reset, its output, connected to terminal C (FIGS. 2 and 2*a*) goes high. Thereafter, shift registers 56 and 70 are clocked by the $2^0$ count of counter 32 to read out the data therefrom in serial fashion from shift register 70. The output data is read out to shift register 130.

Initially, first state counter 64 generates tape gap control signals by way of a gate 102, which signals are directed to terminal B (FIGS. 2 and 2*a*) and thereby to shift register 132 so that a 2-bit gap can be placed on the tape. This is done at counts $S_0$ and $S_1$ of counter 64. Thereafter, a 2-bit gap is developed between a pair of adjacent groups of characters, it being remembered that there are four such groups in a complete scan of the key switches by scanning circuit 28.

The 6-character bits from shift register 70 are read out to shift register 130 during states $S_2$ through $S_7$ of first state counter 64. Then, the character prefix code is developed in the following fashion and applied to terminal A (FIGS. 2 and 2*a*) and thereby to shift register 130, it being remembered that the prefix for the first group is 00: during states $S_8$ and $S_9$ of first state counter 64, second state counter 66 will not have yet reached the count of 100. Accordingly, during states $S_8$ and $S_9$, the prefix 00 will be generated at the outputs of AND gate 104 and AND gate 106. The outputs of these gates are coupled through a gate 108 and gate 100 to terminal A and shift register 130. Also, during states $S_8$ and $S_9$, the output of NOR gate 110 is coupled by way of OR gate 112 and NAND gate 114 to clocking gate 72 to disable the latter, thereby terminating the application of the clocking signals to the clocking inputs of shift registers 56 and 70. This holds the data in the latter two elements during the recording of the character prefixes onto the tape.

After the complete byte of the first character group has been directed into shift register 130, second state counter 66 steps to a count of 100 and first state counter 64 resets to $S_0$ thereby initiating the transmission of the second group of data, the second group of 6-bits in shift register 70. As before, during states $S_0$ and $S_1$, tape gap signals are generated by gate 102 and a two-bit gap is developed and directed to shift register 132. During states $S_2$ through $S_7$ of counter 64, the data, if any are in shift register 70, are serially read out of the latter and sent by way of gates 98 and 100 to shipped register 130 for subsequent recording on the tape. If no bits are present in shift register 70, write control flip-flop 90 is set during the first count $S_1$ of counter 64, thereby causing its reset output to go low.

Assuming that data does exist in shift register 70, gate 104 will generate one bit after first state counter 64 reaches a count $S_8$. This one bit is coupled by way of gate 108 and gate 100 to the first buffer means. During the count $S_9$ of counter 64, a 0 bit is recorded in the second prefix bit position since second prefix gate 106 is not enabled because the 200 count of counter 66 has not as yet been reached. Thus, the prefix 01 is developed immediately following the second group. As before, clocking gate 72 is disabled by gates 110, 112 and 114 when the prefix recording is being performed to hold the data in shift registers 56 and 70.

After the second complete group of characters has been directed with its proper prefix into shift register 130, second state counter 66 steps to the count of 200 and first state counter 64 is again reset to the $S_0$ count. The third character group is now serially transmitted to shift register 130 by clocking shift registers 56 and 70 so that the data, if any are in shift register 70, will be serially shifted by way of gates 98 and 100. If no one-bit is in shift register 70, write control flipflop 90 is set during the first count S1 of counter 64, thereby causing its reset output to go low.

To write the prefix corresponding to the third group, during counts $S_8$ and $S_9$ of counter 64, gate 104 is disabled because there is no 100 count of counter 66. Thus, a 0 will be the first prefix added to the tape. However, gate 106 is enabled because of the presence of count 200 of counter 66 so that a one-bit will be directed to shift register 130 to thereby provide the prefix 10. After the third character group has been recorded, second counter 66 steps to the count of 300 and first state counter 64 is initialized.

Recording of the fourth character group proceeds in the manner described above with the following exception: during state 300 of second state counter 66, flip-flop 90 is held in a reset condition in response to the 300 count via inverter 87 and gate 88. Thus, write control flip-flop 90 is enabled so that the fourth character group is always transmitted to the tape transport even if this character group has zero bits. Thus, there will always be a reference by means of which a computer can orient the data after it has been read out thereto from the tape.

The 11 prefix is provided for the fourth character group because the 100 and 200 states of second state counter 66 are high to represent the 300 state of the counter. Thus, when $S_8$ and $S_9$ successively go high, signals from the outputs of gates 104 and 106 are directed onto shift register 130 to complete the corresponding byte.

After second state counter 66 steps to a count of 400, master control flip-flop 60 is set by a latch flip-flop 116 when counter 32 reaches the $2^6$ count. This results in the generation of an inhibit signal (INH) at the reset terminal of flip-flop 60 which resets counters 64 and 66. The inhibit signals is also applied via gate 114 to block the data output gate 98 from transmitting data to shift register 130. Thereafter, operation proceeds as described for the next data loading mode.

Shift registers 130, 132 and 134 are clocked in the following manner for read-in of signals thereto. Gate 136 is qualified by the signal on terminal E to pass the tape clock signals on terminal D to gate 137. The inverted qualifying signal present at the input of a gate 138 qualifies gate 137 to pass the clock signals to the three shift registers 130, 132 and 134. Accordingly, data signals are clocked into shift register 130 at the relatively high frequency, namely, about 8000 $H_z$. In proper sequence, gap signals are clocked into shift register 132 and group character bit qualifying signals are similarly clocked into shift register 134. A gate 140 coupled to the input of a write clock 141 of the tape transport is disqualified via the inverted enable signal on line 142 connecting a flip-flop 143 to terminal E through an inverter 144 so that no write clock signals are generated during storage of information into the three registers. Flip-flop 143 also controls the motor clock 145 of the tape transport.

Read-out of signals from shift registers 130, 132 and 134 occurs in the following manner:

When counter 66 (FIG. 2) reaches the 400 state, so that master control flip-flop 60 is switched to the opposite state, gate 136 is disabled and gate 138 is enabled along with write clock output gate 140. Thereafter, the low frequency clock signal train from clock 135 is coupled via gate 138 and 137 to the clock inputs of shift registers 130, 132 and 134 to enable the corresponding stored signals to be read therefrom. As each clock control bit emerges from the output of shift register 134, gate 140 is enabled to transmit a low frequency write clock pulse from clock 135 to write clock 141. It will be remembered that a one bit is written for each corresponding bit of valid data stored in shift register 130; conversely, if no valid data exists in a byte location of shift register 130, corresponding to the first three of the four bytes of a complete character scan, clock control register 134 contains a zero bit corresponding to such byte and gate 140 will be blocked. Thus, no write clock signals are generated whenever any one of the first three character groups or bytes contains all zeros. However, the fourth byte is always recorded as mentioned above. Also, if any of the first three character groups contains at leat one one-bit, six write clock pulses will be transmitted by gate 140 thereby enabling the associated transport to record the entire corresponding character group.

The write clock signals output from gate 140 are used to clock flip-flop 143 which is connected at a frequency divider for generating motor clock signals having a frequency one-half the frequency of the signal train provided by generator 135.

To identify a particular keyboard, one or more of terminal straps 34 are arranged in a particular manner to provide a signal at the output of summing junction 54 (FIG. 1). This signal is loaded into shift registers 56 and 70 at the beginning of operation of apparatus 10, before any of the keys are depressed to record stenographic information. The sequence is as follows:

Bail switch 51 is closed so that scanning of the outputs of demultiplexer unit 30 occurs since power is then applied to transistors 38 and 40. Counters 32, 64 and 66 will initially be operating since master clock 33 will be in operation. A load switch 118 (FIG. 2) is then manually closed causing the output of an inverter 120 to go low to provide a load signal applied to the following locations: to the input of gate 68 to enable gate 54 to permit data signals to be gated into shift registers 56 and 70; to the input of a gate 122 coupled between gates 100 and 108 to permit read-out of data from shift register 70 through gates 98 and 100; to the input of a gate 124 (FIG. 2) whose output is coupled to the input of gate 112 to prevent further read-out of data to gate 98 after counts $S_8$ and $S_9$ are reached; and to the input of a gate 126 whose output is coupled to an input of gate 72 to assure clocking of shift registers 56 and 70 upon receipt of the 2° signal at the input of gate 72. Thus, when load switch 118 is closed, the signals generated by terminal straps 34 will be loaded into shift registers 56 and 70, then will be read out to the tape transport before the actuation of the keys of the stenographic keyboard. This will assure that the stenographic data recorded on the tape will be properly identified as to the particular keyboard being used.

Actuation of the accent key described above functions to delimit the extent of a word, i.e., it advises those characters which should be clustered together as a complete word or phrase. This is to be distinguished from the stroke time-out circuitry provided by one-shot multivibrator 82 which delimits the extent of a single stroke which may or may not constitute the entire phrase. The accent bit, defined by the term X, is generated by an accent key normally located on the keyboard in front of the vowel keys. The switch associated with the accent key comprises a capacitive switch which generates a pulse when the accent key is lightly touched by the operator. Generation of the accent pulse causes multivibrator 27 to be re-set which turns on transistor 29. The change of state of multivibrator 27 is indicated by the actuation of a lamp (not shown) coupled to a terminal 31, the latter being connected to the output of multivibrator 27. Actuation of the lamp indicates to the keyboard operator that the accent pulse has been generated.

When transistor 23 is sequentially turned off by demultiplexer 30, which is accomplished by strobing the A output thereof when the second array line is enabled by transistor 40, a one-bit is generated and coupled to level comparator 48.

The delimiting function of the accent bit is accomplished as follows: each time the operator actuates the second and subsequent keys, if any, of a word or phrase, the accent bar is lightly touched or approached by the operator and the accent bit is generated in the proper bit position of the fourth bit. As long as a one-bit is detected in this position, the data characters will be grouped until a character group is detected in which the one-bit is absent from the accent bit position. This effectively signals the software to delineate grouping of the characters previously received.

The complete magnetic encoding format is, therefore, as follows:

| | 1 | 2 | 3 | | |
|---|---|---|---|---|---|
| Data | 00 | HWPKTS | GG | Byte 1 | |
| Format: | 01 | UE*OAR | GG | Byte 2 | |
| | 10 | GLBPRF | GG | Byte 3 | Tape Direction |
| | 11 | XNZDST | GG | Byte 4 | → |

As shown above, data is recorded in four byte groups. Each byte consists of 10 bit cells. The first two-bit cells (column 3 above) are used for delimiting in the data recovery process. No flux reversals are permitted in this region.

The next six-bit cells contain data relating to a group of six keys on the keyboard. These cells are shown in column 2 with the right-hand bit being the least significant bit.

The least two-bit cells, shown in column 1, contain the byte identification number which has the range 0 to 3. The two high order bits in byte 4, column 2, are special keys which do not relate to adjacent data. The term N represents the number bar or shift key of the keyboard. The term X is a special function designator. In machines using a real time clock, this bit is set when bytes 1, 2 and 3 contain time data. Time data is written in the same format as the key data, i.e., 6 data bits per byte. The clock range is 0 to $2^{18}$ seconds or approximately 72 hours.

Data is magnetically encoded on the tape in a two-track NRCI format. The packing density is 120 B.P.I. nominal.

Figure 5:
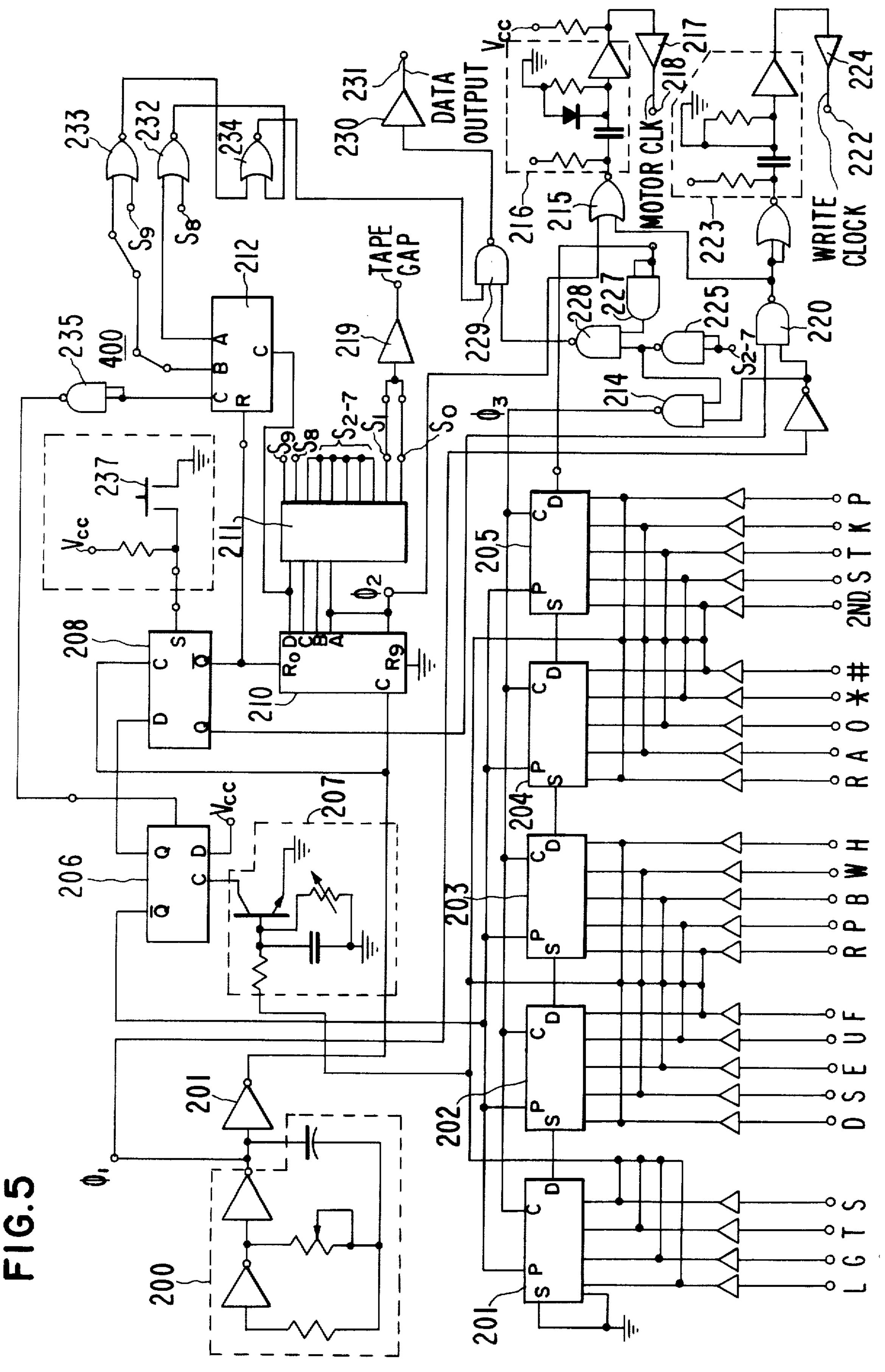
FIG. 5 is a schematic of a circuit representing a second embodiment of the system of the present invention, wherein key actuation causes data signals to be sent directly in parallel into a memory for subsequent readout therefrom.

A second embodiment of the system of the present invention is shown in FIG. 5. In this system, the individual key switches of a stenographic keyboard are each coupled directly to separate individual stages of a plurality of parallel input serial output shift registers 201–205. Shift registers 201–205 are preferably commercially available type 7496 integrated circuits each having the customary C and P inputs as shown. The switch inputs to shift registers 201–205 are all coupled in parallel to the clock input of a D type flip-flop 206 via a common key filter circuit 207. Filter circuit 207 is a conventional circuit for preventing spurious pulse transitions not associated with the actuation of a key from affecting the state of flip-flop 206 and for generating a pulse when the last key in a character group has been released. Flip-flop 206 is used to control the operation of a D type flip-flop 208 and also to enable registers 201–205 for storage of fresh data after previously stored data has been fetched or read out therefrom, both functions being performed in the manner described below. A clock 200 provides a master clock signal train $\phi_1$ to the various system components of FIG. 5.

Clock signal train $\phi_1$ is inverted by an inverter 201 and coupled to the clock inputs of flip-flop 208 and a first control counter 210. In the preferred embodiment first control counter 210 is a type 7490 binary coded decimal counter, the outputs of which are used to step a second control counter 211 and a scale-of-four counter 212. In the preferred embodiment, counters 211 and 212 are commercially available type 7447 and 7493 counters, respectively. Counter 210 and 211 function in a similar manner to scale-of-ten counter 64 (FIG. 2) while counter 212 is the equivalent of scale-of-four counter 66 (FIG. 2). In addition, the signals occuring on the least significant digit output terminal of counter 210 are used as a second clock signal train designated $\phi_2$. Clock signal train $\phi_2$ is used to generate motor clock signals which occur at a frequency which is one-half the frequency of clock signal $\phi_1$.

A third clock signal train $\phi_3$, which is generated during steps 2–7 of counter 211 at the output of inverting AND gate 214, is coupled to the clock inputs C of shift registers 201–205. Thus, the information stored in these elements is serially fetched or read out via the output of shift register 205 during steps 2–7 of counter 211.

In operation, with clock 200 in the active state, actuation of the first character key of a phrase causes the corresponding stage of the associated shift register to be set. Successively actuated keys cause the corresponding stages of the shift registers 201–205 associated thereto to be similarly set. So long as the individual keys are actuated in an overlapping manner, flip-flop 206 remains in the reset state. When the last overlapped key is released, a positive-going pulse is generated by common key filter circuit 207 and applied to the clock input of flip-flop 206, thereby causing this element to switch to the set state. This conditions flip-flop 208 to be set by the next appearing clock signal train $\phi_1$ at the clock input thereto.

When flip-flop 208 sets, the Q output thereof enables an inverting AND gate 220 to transmit clock signal train $\phi_1$ to the write clock output terminal 222 via a pulse shaper 223 and an amplifier 224. With flip-flop 208 in the set state, counters 210 and 212 are directly released for counting by clock signal train $\phi_1$.

As counter 210 is activated, clock signal train $\phi_2$ is generated in the manner noted above and applied via an inverting OR gate 215, a pulse shaper 216 and an amplifier 217 to the motor clock output terminal 218, thereby enabling stepping of the associated tape transport.

As counter 211 steps through states $S_0$ and $S_1$, tape gap signals are generated at the output of an amplifier 219 having the $S_0$ and $S_1$ output terminals of counter 211 as the inputs thereto.

When counter 211 is incremented to the $S_2$ state, gate 214 is enabled by gate 225 to generate clock signal train $\phi_3$. Clock signal train $\phi_3$ then clocks the data in shift registers 201–205 to the right as viewed in FIG. 5 so that the data stored in these elements is serially fetched from the output terminal of shift register 205 and transferred via gates 227, 228, 229 and amplifier 230 to the data output terminal 231. Data output continues in this fashion until counter 211 is stepped to the $S_8$ state.

During the $S_8$ and $S_9$ states of counter 211, inverting OR gates 232 and 233 generate the character prefix codes noted above in the discussion of FIG. 2 embodiment. These codes are coupled via gates 234 and 229, and amplifier 230 to the data output terminal 231.

After scale-of-four counter 212 is stepped to the 400 state, flip-flop 206 is reset by the output of gate 235, thereby enabling shift register 201–205 to receive the next keyboard generated character. Flip-flop 208 is then reset by the next appearing clock signal from clock signal train $\phi_1$. When flip-flop 208 switches to the reset state, counters 210 and 211 are reset and held in the reset condition until flip-flop 208 is again set at the end of the next keyboard generated word in the manner noted above.

A manually actuatable load switch 237 is provided which functions in a manner similar to load switch 118 of the FIG. 2 embodiment. Briefly, when switch 237 is closed, flip-flop 208 is switched to the set state and forceably held in this state until switch 237 is released. This enables the system of FIG. 5 to cycle several times to provide keyboard generated data output signals serving to identify the communicating keyboard.

We claim:

1. A data processing system for use with a stenographic keyboard having a plurality of key-operated switches each associated to a different key for generating a single bit bilevel signal representative of the state of the associated key, said system comprising:

storage means adapted to be coupled to said switches and responsive to the actuation of at least one said key for cumulatively storing all of said single bit signals in a predetermined order;

means responsive to the subsequent release of all of said keys for disabling the storage of additional single bit signals;

means for serially fetching the contents from said storage means as a serial bit stream having a number of bits equal to the number of said keys after said subsequent release of all keys;

means for generating a plurality of predetermined different multibit binary prefix code signals each associable to a different portion of said serial bit stream;

formating means for interjecting said binary prefix code signals in the serial bit stream at predetermined locations to form a modified serial bit stream comprising a plurality of character groups each identified by the corresponding prefix code signal;

output means coupled to said formating means having an output terminal for manifesting said modified serial bit stream;

means for transferring said modified serial bit stream to said output means; and means responsive to the transfer of the last bit of said modified serial bit stream to said output means for re-enabling said storage means to store all of said single bit signals in response to the subsequent actuation of one of said keys.

2. The system of claim 1 wherein said storage means comprises a parallel input-serial output register having a plurality of input terminals each adapted to be coupled to a different one of said switches.

3. The system of claim 1 wherein said storage means comprises means for sequentially sampling said key-operated switches in a predetermined order to generate a serial input bit stream, and memory means configured as a first in-first out recirculating storage device having an input coupled to said sampling means.

4. The system of claim 1 wherein said fetching means includes means for sensing the absence of a single bit signal from predetermined portions of said storage means, and means responsive to said sensing means for preventing transmission of the signals stored in said predetermined portions to said output terminal.

5. The system of claim 1 wherein said formating means includes means for generating a plurality of tape gap signals for delineating the boundary between adjacent ones of said individual character groups, and wherein said output means includes means for inhibiting the transfer of said modified serial bit stream to said output means during generation of said tape gap signals;

and wherein said transfer means includes means for transferring said tape gap signals to said output means.

6. A method of generating binary information signals from the operation of a stenographic keyboard having a plurality of key-operated switches each associated to a different key, said method comprising the steps of:

a. generating a plurality of single bit bilevel signals each representative of the state of a different key associated thereto;

b. cumulatively storing all of said single bit signals in a predetermined order in response to the actuation of at least one of said keys;

c. disabling the storage of additional single bit signals in response to the subsequent release of all of said keys;

d. serially fetching the contents from said storage means as a serial bit stream having a number of bits equal to the number of said keys after said subsequent release of all keys;

e. generating a plurality of predetermined different multibit binary identification code signals each associated to a different portion of said serial bit stream;

f. interjecting said binary identification code signals in the serial bit stream at predetermined locations to form a modified serial bit stream comprising a plurality of character groups each identified by the corresponding identification code signal;

g. transferring said modified serial bit stream to an output terminal; and h. re-enabling said storage means after the transfer of the last bit of said modified serial bit stream to said output terminal to store all of said single bit signals in response to the subsequent actuation of one of said keys.

7. The method of claim 6 wherein said step (b) of storing includes the step of transferring each of said single bit signals to a different location in said storage means.

8. The method of claim 6 wherein said step of storing includes the steps of:

i. sequentially sampling said key-operated switches in a predetermined order to generate a serial input bit stream;

ii. coupling said serial input bit stream to the input of a serial storage register; and iii. re-circulating said serial input bit stream in said storage means until said subsequent release of all of said keys.

9. The method of claim 6 wherein said step (d) of serially fetching includes the steps of:

i. sensing the absence of a single bit signal representative of an actuated key from predetermined portions of said storage means; and ii. preventing transmission of the signals stored in said predetermined portions to said output terminal.

10. The method of claim 6 further including the steps of:

i. generating a plurality of tape gap signals for delineating the boundary between adjacent ones of said individual character groups;

ii. transferring said tape gap signals to an output terminal; and iii. transfering said modified serial bit stream to said output terminal during generation of said tape gap signals.

* * * * *